Figure 1:
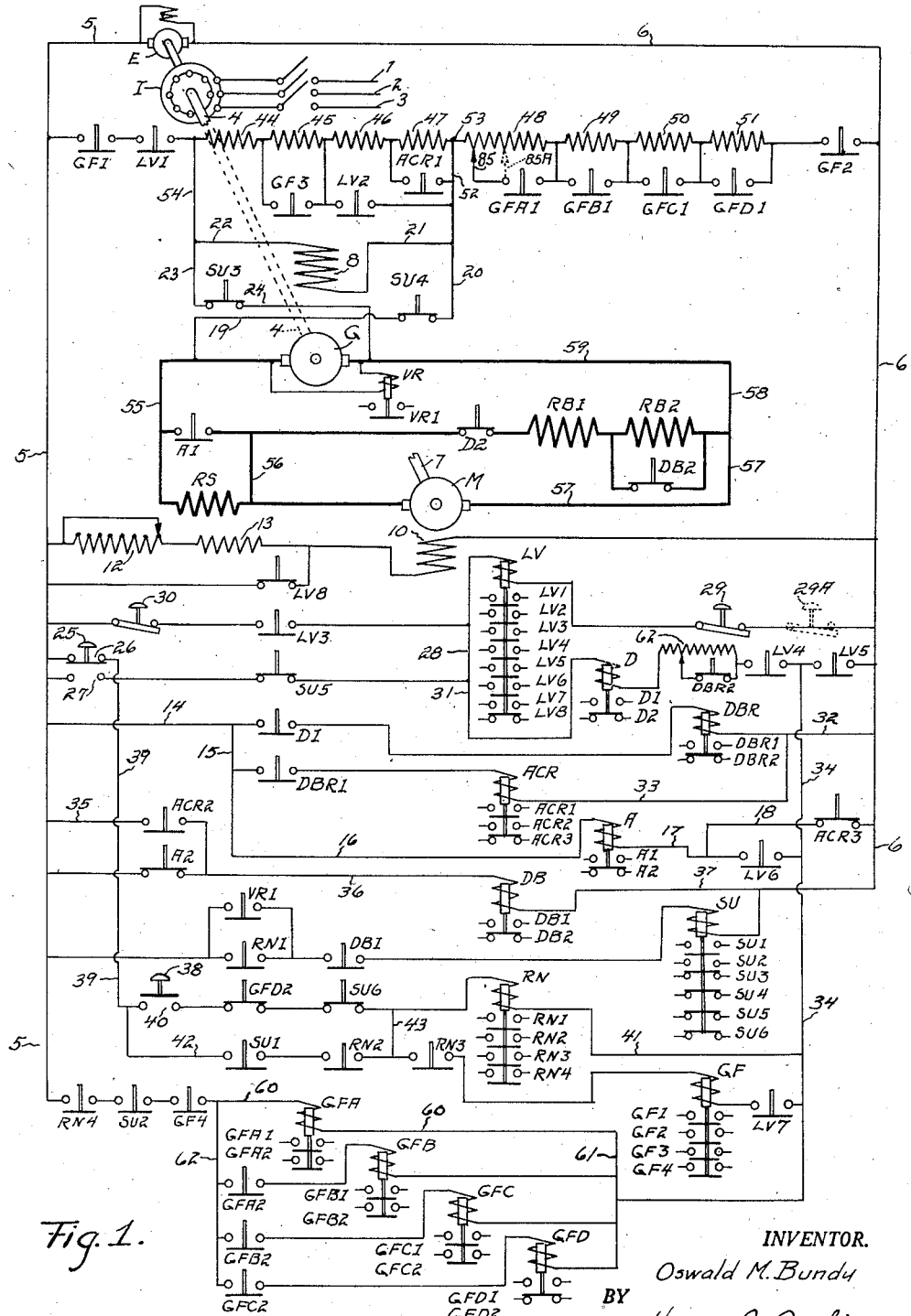

Nov. 25, 1947. O. M. BUNDY 2,431,459
MOTOR CONTROLS WITH EMERGENCY STOP
Filed Sept. 14, 1944 3 Sheets-Sheet 2
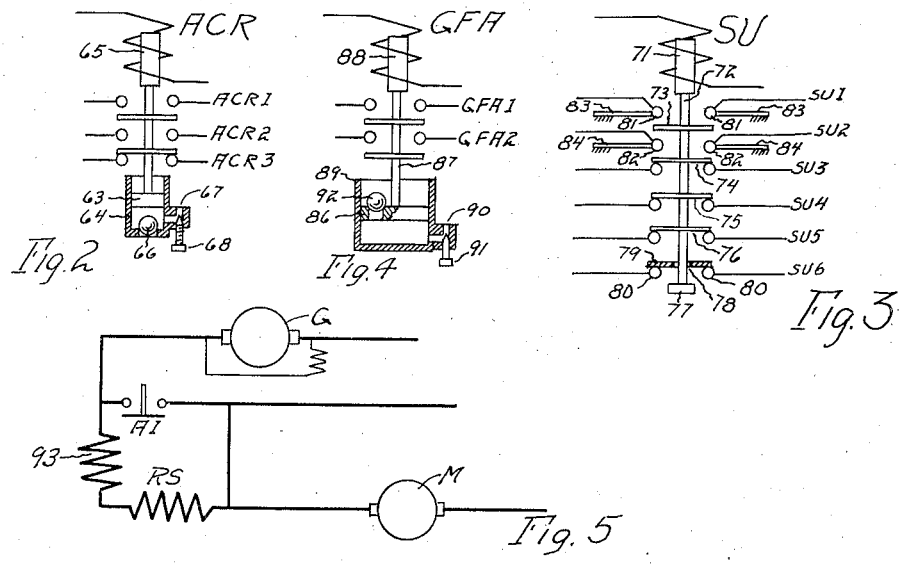
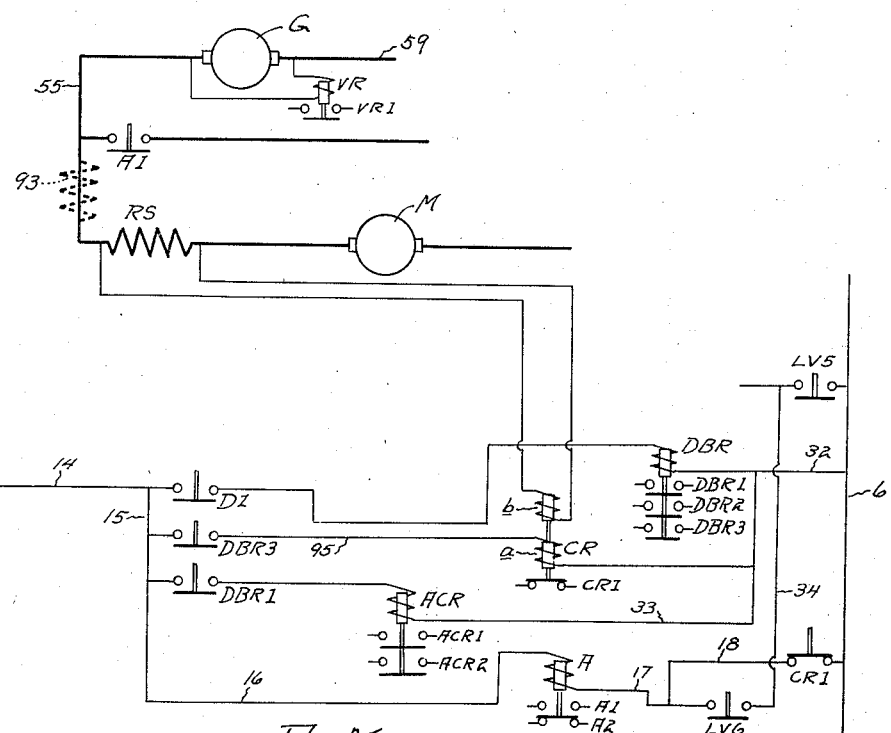
INVENTOR.
Oswald M. Bundy
BY
Harry R. Canfield
ATTORNEY Patented Nov. 25, 1947

2,431,459

UNITED STATES PATENT OFFICE 2,431,459

MOTOR CONTROL WITH EMERGENCY STOP

Oswald M. Bundy, Cleveland, Ohio, assignor to The Clark Controller Company, Cleveland, Ohio, a corporation of Ohio Application September 14, 1944, Serial No. 554,086

12 Claims. (Cl. 172—239)

1

This invention relates to electrical systems applicable to the control of an electric motor to start and stop it, and to control its speed in accordance with the character of the load driven by the motor, and relates particularly to such motor control systems which provide for stopping the motor and its driven load in a very short interval of time.

As will appear hereinafter, the control is applicable to motors as used in various arts, processes and industrial applications, in which electric motor power is used; but in order to make a concrete disclosure of the invention, I have chosen to illustrate and describe it herein as applicable to a motor which drives a stand of calender rolls for rolling sheet material, for example rubber, to preselected thickness. Such calender roll machines themselves are well known and may comprise a number of rolls one above the other two-high, three-high, etc., through which the material is fed. The attendants at such machines work in close proximity to the rolls, and through carelessness or inadvertence their hands or clothing may sometimes be caught and drawn into and between the rolls; and for their protection against injury it becomes important to be able to stop rotation of the rolls instantaneously or as nearly so as possible. Also, the material as fed to the rolls is often of irregular thickness; and in the case of rubber, for example, a lump of the material too large to be rolled may start to feed into the rolls; and it sometimes therefore becomes necessary to stop the rolls instantaneously to prevent jamming them by the material and spoiling the work, or to prevent damage to the machine.

Again, it is desirable to drive such rolls at high speed in the regular production of work, but to be able to drive them at a low or creeping speed, or with a start and stop inching movement, when a job of work is being started; and thereafter to be able to speed up the rolls to the optimum high speed for the particular material being worked.

When the rolls are driven by an electric motor as here contemplated, the control for the motor must therefore provide means for starting and stopping it with inching movements; operating it at variable low speed; variably adjusting the speed to a high production speed; and to be able to instantaneously stop the motor when running at high speed upon the occurrence of any emergency such as those mentioned above which might otherwise cause injury to the workmen at the machine or to the machine itself, or to the work.

It is well known that in any application of motor power where a wide range of speed variation is wanted, the direct current type of motor is often the most practicable; and it is also well known that a direct current motor can be braked by dynamic braking, by connecting it in a local circuit in which it acts as a generator and by dissipating the energy of the generated current load in a resistor; but the usual dynamic braking control falls short of the requirements of an application such as that outlined above.

Also, in prior practice, it has been found that where a motor is to be operated throughout a wide range of adjustable speed, the full rated torque and power of the motor cannot be developed at all speeds if it be supplied from mains always at the same voltage; and this has led to the provision of supply mains at two or in some cases three different voltages, a change over from one voltage to another being made as the speed of the motor is changed from one part of its speed range to another; and this obviously has led to complications and expense in the control system.

In some cases in prior practice, it has been proposed to supply the current to the motor from a generator provided for that specific purpose, and to vary the voltage supplied to the motor by varying the output voltage of the generator; and in this manner some of the deficiencies of a single voltage motor control have been obviated; but such systems have not been adaptable to, and have not provided the instantaneous stopping of, the motor in emergencies as above mentioned.

According to the present invention, and speaking generally, a direct current motor for driving the load is supplied with power from a direct current generator driven by a constant speed power source motor, for example an alternating current induction motor; and means is provided for varying the speed of the load driving motor over a very wide range and in an improved manner, by a control system actuated by a single constant voltage; and emergency stop means is provided which when put into operation weakens the field of the generator to weaken its voltage in an improved manner by a plurality of concurrent actions, and electrically brake the motor in an improved manner by a plurality of concurrent actions; whereby the voltage of the generator is ultimately destroyed and the motor is brought to rest in the minimum period of time.

It is therefore the object of the invention to provide an improved method and means by which a load driving motor can be adjusted in speed over a wide range for normal operation; and by which, upon the occurrence of an emergency can be stopped in the minimum of time.

The invention is fully disclosed in the following description, taken in connection with the accompanying drawing in which:

Fig. 1 is a diagrammatic view illustrating an embodiment of the invention.

Figure 6:
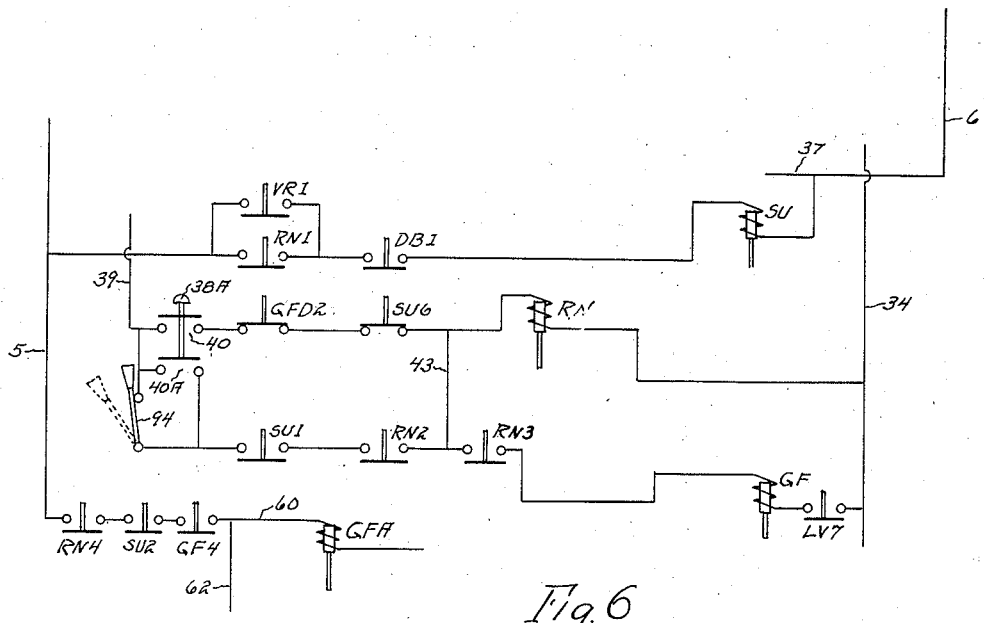

Fig. 2, Fig. 3, and Fig. 4 are in each case views to enlarged scale of certain contactors of Fig. 1 and illustrating modifications thereof;

Fig. 5, Fig. 6, and Fig. 7 are views similar respectively to parts of Fig. 1 but showing modifications.

In the embodiment of the invention illustrated diagrammatically in Fig. 1 there are a number of electromagnetic contactors comprising each a winding and a plunger and a number of double break contacts operated thereby. Some of the contacts are closed and some are open, when in normal condition, that is when the windings are de-energized; and the entire system is illustrated with the parts in normal unergized condition.

To simplify the drawing so that the various electrical circuits may be represented in the so-called "across-the-line" type of diagram, adopted by engineers generally, each contactor is shown complete as having all of its contacts associated with it unitarily, but with the circuit connections to the contacts shown fragmentarily and broken off; and each of these contacts is reproduced fragmentarily elsewhere in the diagram with the complete circuit connections thereto.

The contactors and their contacts are as follows:

Contactor LV having open contacts LV1 to LV7 inclusive and closed contacts LV8.

Contactor D having open contacts D1 and closed contacts D2.

Contactor DBR having open contacts DBR1, and closed contacts DBR2.

Contactor ACR having open contacts ACR1 and ACR2 and closed contacts ACR3.

Contactor A having open contacts A1 and closed contacts A2.

Contactor DB having open contacts DB1 and closed contacts DB2.

Contactor SU having open contacts SU1 and SU2 and closed contacts SU3 to SU6 inclusive.

Contactor RN having open contacts RN1 to RN4 inclusive.

Contactor GF having open contacts GF1 to GF4 inclusive.

Contactor GFA having open contacts GFA1 and GFA2.

Contactor GFB having open contacts GFB1 and GFB2.

Contactor GFC having open contacts GFC1 and GFC2.

Contactor GFD having open contacts GFD1 and closed contacts GFD2.

Contactor VR having open contacts VR1.

At I is the source of power motor, which in the embodiment illustrated is a squirrel cage induction motor supplied by polyphase mains 1, 2, and 3; and it is connected by a shaft 4, to the direct current generator G, to drive it, substantially at the constant speed of the source motor I. An exciter E is also driven by the source motor I and supplies direct current to mains 5 and 6, at substantially constant voltage for operating the control system.

At M is the load driving motor, the shaft 7 of which is connected to the load to be driven, not shown.

The generator G has a shunt field winding 8, and the load motor M has a shunt field winding 10.

Various resistors, circuit connections, operators' contactors, and other elements of the system not identified above will be described in connection with a description of the operation of the system as a whole which now follows:

When the source motor I is started and brought to speed and drives the rotor of the generator G, it also drives the exciter E and energizes the control mains 5 and 6 and maintains them energized at substantially a constant potential.

The shunt field 10 of the load driving motor M is at this time energized directly across the mains 5 and 6 through the closed contacts LV8, but these contacts will presently be opened for normal operation, and the field winding 10 will then be energized through a rheostat 12 and a fixed value resistor 13, the rheostat 12 when operated adjusting the energization of the field winding for the purposes of varying the speed of the motor M in the upper ranges of its speed, and the resistor 13 predetermining the maximum degree to which the field 10 may be adjustably energized, for speed control.

At this time, also the contactor A is energized across the mains 5 and 6 through wires 14, 15, 16, 17, and 18 and through the closed contacts ACR3. The contacts A1 are accordingly closed and the contacts A2 open. Otherwise the system remains unenergized.

The field winding 8 of the generator G is at this time not energized. It is shown in the drawing as connected across the terminals of the generator G by wire 19, closed contacts SU4, wires 20, 21, 22, 23, closed contacts SU3, and wire 24; but although the generator G is being driven, this shunt field winding does not build up and energize the generator as might be expected from inspection of the drawing because the polarity of the potential which might thus be supplied from the generator G to the field 8 through the circuit just described and which might result from any residual magnetism of the field winding 8, is in the direction to reduce the residual magnetism or de-magnetize the generator field to zero excitation, from which it cannot build up in the other direction.

To put the system into operation, a Stop-Reset switch 25 which may be of the push button type, and which has normally closed contacts 26 and normally open contacts 27, is depressed by the operator. This makes a circuit from the main 5 through the now closed contacts 27, closed contacts SU5, wire 28, winding of the contactor LV, through closed emergency switch 29, to the line 6; and contactor LV being thereby energized, operates, closing its contacts LV1 to LV7 inclusive and opening its contacts LV8. The result of opening contacts LV8 was described above.

Closing of contacts LV3 makes a holding circuit for the contactor LV, from the main 5 through closed emergency switch 30, through the now closed closed contacts LV3, through the winding of contactor LV and emergency switch 29, to main 6; so that when the stop-reset switch 25 is released, opening the contacts 27 (and closing contacts 26) the contactor LV will remain operated.

The said operation of the stop-reset switch 25 also causes current to flow through the contacts 27 and SU5 as before, and by wire 31 through the winding of contactor D, through now closed contacts LV4 and LV5 to main 6, operating contactor D and closing its contacts D1 and opening its contacts D2.

Current now flows from main 5 through wire 14, through now closed contacts D1, through winding of contactor DBR, and by wire 32 to main 6, operating contactor DBR, closing its contacts DBR1, and opening its contacts DBR2.

A resistor 62, in series with the winding of contactor D, is normally bridged by the closed contacts DBR2, so that the contactor D is operated by full energizing current, but upon opening of contacts DBR2, this resistor reduces the current in the winding of contactor D to so low a value that it is barely enough to hold the contactor D operated, whereby it will be restored instantly and instantly close its contacts D2 (for a purpose to be described) when its current is broken.

Current now flows from the wires 14 and 15 through now closed contacts DBR1, through winding of contactor ACR, and by wires 33 and 32 to main 6, operating contactor ACR and closing its contacts ACR1 and ACR2 and opening its contacts ACR3. This contactor operates instantly when energized, but in some cases it may be desirable to adjustably delay its restoring when de-energized to delay closure of its contacts ACR3 for a purpose to be referred to. This adjustably delayed restoring has not been shown in Fig. 1; but may be provided by any well known means, and is shown diagrammatically in Fig. 2 where the contactor ACR is reproduced to larger scale. A piston 63 in a cylinder 64 and attached to the plunger 65 lifts a ball check valve 66 for unretarded upward movement of the plunger, and upon downward movement of the plunger, the air in the cylinder under the piston escapes through a port 67 adjustably restricted by a screw valve 68.

The opening of contacts ACR3 opens the line 18 through which the winding of contactor A was energized, but the contactor A remains energized because the current therethrough can flow through closed contacts LV6 and by wire 34 upwardly and through closed contacts LV5 to main 6, this being a holding circuit for the contactor, A.

Closing of contacts ACR2 (contacts A2 being open) causes current to flow from main 5, by wire 35 through now closed contacts ACR2, by wire 36, through the winding of contactor DB, and by wire 37 to main 6, operating contactor DB and closing its contacts DB1 and opening its contacts DB2.

Contacts DB1 are in the line of the winding of contactor SU, but this winding is not at this time energized upon closure of contacts DB1, because the circuit is open both at the contacts VR1 and RN1.

The stop-reset switch 25 may now be released and the winding of contactor LV remains energized through the holding contacts LV3; winding of contactor D remains energized through closed contacts LV3, wires 28 and 31, resistor 62, and closed contacts LV4 and LV5; winding of contactor DBR remains energized through contacts D1; winding of contactor ACR remains energized through contacts DBR1; winding of contactor A remains energized through contacts LV6 and LV5; winding of contactor DB remains energized through contacts ACR2; and the system is now ready to be operated to energize the field of the generator G, and cause it to supply current to the load motor M and drive it.

To do this, the start switch 38 which may be of the push button type, is closed by the operator, and current then flows from the main 5, through the upper and now closed contacts 26 of the stop-reset switch 25, by wire 39, through the contacts 40 of the start switch through closed contacts GFD2 and SU6, and through winding of contactor RN, through wires 41 and 34 and thence through contacts LV5, to main 6, operating contactor RN and closing its contacts RN1 to RN4 inclusive.

Closing of contacts RN1 energizes the winding of the contactor SU, the current flowing from wire 5, through closed contacts RN1, through closed contacts DB1, and winding of contactor SU, to wire 37, to main 6, and the contactor SU operates, closing its contacts SU1 and SU2, and opening its contacts SU3 to SU6 inclusive.

The operation of the contactor SU, by closing contacts SU1, establishes a holding circuit for contactor RN, independently of the start switch 38, current flowing from the wire 39, by a wire 42, through now closed contacts SU1 and RN2, and by wire 43 through the winding of contactor RN and so on, so that although contacts SU6 are now open, the winding of contactor RN remains energized, and the start switch can now be released; and the contactor SU will also remain operated, through the contacts RN1 as described.

Since opening of contacts SU6 opens the operating circuit for contactor RN, and closing of contacts SU1 closes a holding circuit for it, it may be desirable to insure that contacts SU6 open after contacts SU1 close. This may be accomplished by any known means in contactor construction generally, and is not shown in Fig. 1, but is shown diagrammatically in Fig. 3, wherein when the plunger 71 is raised by energization of the winding, and raises the stem 72, bridging bars 73 to 76 and a head 77 and bridge secured to the stem rise with it. The stem 72 passes through a perforation 78 in a bridging bar 79 which normally bridges contact elements 80—80 of the double break contacts SU6. The bars 73 and 74 normally bridge contact elements 81—81 and 82—82 of the double break contacts SU1 and SU2, and are supported on yieldable springs 83—83 and 84—84. After contacts SU1 (comprising the bar 73 and contact elements 81—81) have closed, the stem 72 continues to rise and the head 77 engages the bar 79 and raises it from the contact elements 80—80.

When contactor RN operated and closed contacts RN3, current also flowed through contacts GFD2, SU6, wire 43, contacts RN3, through winding of contactor GF, and through closed contacts LV7, wire 34, contacts LV5 to line 6, operating contactor GF and closing its contacts GF1 to GF4; and when contacts SU1 closed and SU6 opened, a holding circuit for contactor GF was made, independent of the start switch 38, by wires 39 and 42, contacts SU1 and RN2 and RN3, and through winding of contactor GF and so on.

Referring now to the upper part of the diagram, it will be observed that contacts SU3 and SU4 are now open, disconnecting the generator field 8 from the generator G; and that contacts LV1 are closed; and that contacts GF1 and GF2 have just closed; so that current will now be supplied to the generator field 8, from the mains 5 and 6. At 44 to 51 inclusive are generator field resistors or sections of resistance, controlling the energization of the generator field 8. The contacts ACR1 are closed as described, as are also contacts LV2 and GF3, so that field current now flows from the main 5, through the contacts GF1, LV1, resistor 44, contacts GF3 and LV2 and by wire 52, to the point 53; and field current also flows by wire 54 and wires 22 and 21, through the field winding 8, and by wire 52 to the point 53, in parallel with the resistor 44; and from the point 53 the field current flows through the resistors 48 to 51 in series, and through the closed contacts GF2 to the main 6, establishing the minimum field strength for the generator G and independently of its own potential.

The polarity of the potential producing this generator field is opposite to that which the generator G itself would supply to the field winding 8 if the contacts SU3 and SU4 were closed, as was described above.

The driven generator G now develops its minimum potential due to said minimum field energization, and supplies current to the load motor M, the current flowing over the heavy line circuit by wire 55, through closed contacts A1, wire 56, (contacts D2 being open), through the load motor M, by wires 57, 58, and 59, back to the generator G, and the field winding 10 of the motor M being energized as described, (LV8 being open) the motor M starts and rotates slowly at its minimum load driving speed, in its low speed range.

The system now operates to cut out successively the resistors 48 to 51 inclusive, by means of the contacts GFA1 to GFD1 inclusive, to strengthen the field 8 of the generator G and cause it to apply increasing potential to the motor M to increase its power and speed, and this sequence will be apparent in the lower part of the diagram. When the contactor GF operated, and closed its contacts GF4, current then flowed from the main 5, through already closed contacts RN4, SU2, and through contacts GF4, through wire 60, energizing the winding of contactor GFA, and by wire 61 to wire 34 and contacts LV5, to main 6; and contactor GFA operated closing contacts GFA1 and GFA2.

The closing of contacts GFA1 cuts out resistor 48 (or an adjustable part of it as will be described) at the top of the diagram.

The closing of contacts GFA2 energizes the winding of contactor GFB, and it operates, the current flowing from wires 60 and 62 through the contacts GFA2 and through said winding to wire 61 and 34, etc. Operation of contactor GFB closes its contacts GFB1 and GFB2. Contacts GFB1 cut out field resistor 49, and contacts GFB2 energize the winding of contactor GFC, which operates, closing its contacts GFC1 which cut out resistor 50, and closing its contacts GFC2 which energizes the winding of contactor GFD. Contactor GFD upon operating closes its contacts GFD1 which cuts out resistor 51, and opens its contacts GFD2.

The power delivery of motor M and the speed thereof is thus increased, and if all of field resistor 48 is cut out, the motor comes up to what is sometimes called its "base" speed. The rheostat 12 may now be operated to cut resistance into the circuit of the motor field winding 10, and the speed of the motor M may thereby be increased into its higher speed range, either to attain its maximum speed or to adjust its speed to the optimum high speed for the particular load being driven, the particular material being worked upon by the machine being driven, etc.

If however it be desired to operate the motor at base speed, the rheostat 12 will be left in its illustrated condition for maximum operating strength of the motor field 10.

And again, if it be desired to operate the motor at less than base speed, the field 8 of the generator G (and its corresponding voltage), is correspondingly weakened by adjustment of the field resistor 48. As shown, the movable adjusting contact 85 may be moved to points along the resistor 48 (for example to position 85A) so that when the contacts GFA1 close, a part of this resistor will be left in the field energizing circuit.

Thus the operating speed of the motor M may be adjusted to any desired value, at or above, or below the base speed.

The rate at which field resistors 48 to 51 inclusive are successively cut out, may be predetermined by delaying the operation of the contactors GFA to GFD inclusive, after their windings have been energized. This has not been shown in Fig. 1, but may be effected by any well known means and is illustrated diagrammatically in Fig. 4 for the contactor GFA as an example, wherein a known dash-pot arrangement is shown comprising: a piston 86 connected to the stem 87 and plunger 88 and retarded in its upward movement in a cylinder 89 by a restricted air inlet port 90, adjustable by a screw valve 91, a ball check valve 92 in the piston permitting the piston to return without retardation.

Referring again to the start switch 38, when it is first closed it operates contactor RN and then contactor GF, and closure of contacts GF4 initiates the sequential cutting out of the field resistors to accelerate the motor M. But contactors RN and GF cannot be thus operated unless the last of the sequential field resistor contactors, GFD, is de-energized and its contacts GFD2 are closed. This insures that all of the field resistors will be in the field circuit at the time of accelerating the motor M.

Also, after operation of contactors RN, GF, and SU by the start switch 38 as described, the contactor RN maintains control of contactor SU at contacts RN1, and maintains control of contactor GF at contacts RN3; but after contactor SU opens contacts SU6, contactors RN, GF, and SU are out of control of the start switch 38, and are controlled by the holding circuit including stop-reset contacts 26, wires 39 and 42, contacts SU1, RN2, wire 43, winding of contactor RN, wire 41 etc.

The contactor SU is controlled by the contactor VR at the contacts VR1 supplemental to its control by the contactor RN at the contacts RN1. The winding of the contactor VR is energized across the generator G by its potential. As will be clear later, when the contacts RN1 are opened, the contacts VR1 will maintain the contactor SU operated so long as the generator voltage is above a preselected value, predetermined by the operating constants of the contactor VR, unless the contacts DB1 have already opened.

Thus the generator field 8 first becomes energized at GF1 and GF2 with a weak energization as described, upon operation of GF by start switch 38, and then at any time, before or after its energization is increased, the maintenance of its energization is placed on the contacts 26 of the stop-reset switch 25. Operating the stop-reset switch to open its contacts 26, will thus de-energize the contactor GF and disconnect the generator field 8 from the supply mains 5—6 at contacts GF1 and GF2 and reinsert any field resistors 48 to 51 which may have been cut out, and also will de-energize the contactor RN which de-energizes the contactor SU (at RN1) and the latter causes the contacts SU3 and SU4 to connect the field 8 to the reverse polarity of the generator G to reduce its residual field magnetism.

Now since the motor M can be driven by current from the generator only when the generator field 8 is energized, it follows from the above that the motor M can be started by operating the start switch 38 to close its contacts 40, and can be stopped again by depressing the stop-reset switch to open its contacts 26, whereby a creeping or inching movement of motor M may be had for well known purposes, such as those referred to hereinbefore.

As indicated in the foregoing, one of the primary improvements effected by this invention is that upon the occurrence of an emergency the motor M may be stopped abruptly and in a shorter interval of time than is believed to be possible with any prior control system, and this feature of the invention will now be described, the advantages of the invention in this respect being more fully developed and apparent in an instance in which the motor M is running at high speed arrived at as described above.

The generator G will at this time be developing full voltage, and the contactor VR will be operated thereby, holding its contacts VR1 closed.

At 29 and 30 have been illustrated two emergency switches and these are contemplated to be located at different points adjacent to the machine attendants, and within their convenient reach, and there may be any number of such switches corresponding to the switch 29, and any number corresponding to the switch 30, and this has been indicated by illustrating another of such switches 29A in dotted line. These emergency switches may have any suitable or known construction and preferably are of the push button type operable by a touch of the hand or arm or foot. Upon operation and opening of the contacts of any one of such emergency switches, contactor LV will be de-energized, since the holding circuit therefor is, as shown, through these emergency switches in series; and upon de-energization of contactor LV, the following circuit changes occur which will be first described, and then these will be given a description of the effects of such changes.

Contacts LV1 open and disconnect the field 8 of the generator G from the mains 5 and 6; contacts LV2 open and remove the bridge which they effected across the field resistors 46 and 47; contacts LV8 close and short circuit all of the resistance in the circuit of the motor field 10, thus giving it a "forced" or excessive energization.

Contacts LV4 and LV5 open and de-energize contactor D which opens instantly due to its resistor 62; and the opening of contacts LV5 de-energizes the contactors RN, and (as a consequence thereof) GF, GFA, GFB, GFC, GFD; contactor SU is not de-energized, being maintained by contacts VR1 and DB1; and the opening of contacts LV6 and LV5 (contacts ACR3 being open) de-energizes the contactor A.

The said de-energizing of contactor D instantly closes its contacts D2 and this closes a dynamic braking circuit around the load motor M comprising the wire 56, contacts D2, resistor RB1, resistor RB2 (contacts DB2 being open) and wire 57; and the opening of contacts D1 de-energizes contactor DBR.

Closure of contacts D2 also closes a local load circuit around the generator G comprising wire 55, resistor RS (A1 being open), wire 56, contacts D2, resistors RB1 and RB2, and wires 58 and 59.

The said de-energizing of contactor GF opens contacts GF3 and removes the bridge from the field resistor 45.

The said de-energizing of contactor DBR opens contacts DBR1 and thereby de-energizes contactor ACR.

The said de-energizing of contactor ACR effects opening of contacts ACR1 and removes the bridge from the field resistor 47, and effects delayed closing of contacts ACR3 which when closed again energize contactor A.

Contactor A upon being re-energized closes contacts A1 short circuiting the said resistance RS, and by opening its contacts A2 de-energizes contactor DB.

The said de-energizing of contactor DB closes contacts DB2, short circuiting the dynamic braking resistance section RB2; and opens contacts DB1.

Contacts RN1 have already opened upon de-energization of contactor RN as above referred to, so that now opening of contacts DB1 de-energizes contactor SU (unless it has already been de-energized by opening of contacts VR1).

The contactor SU upon being de-energized closes contacts SU3 and SU4 associated with the generator field circuit.

These changes and the sequence in which they occur, and their effects, stated briefly, are:

The field 8 of the generator G is cut off from the supply mains 5 and 6 at LV1, and field resistor 46 is cut in at LV2; and the field 10 of the motor M is excessively energized, or "forced" at LV8.

A dynamic braking circuit is closed around the motor M at D2 through resistors RB1 and RB2; and a local load circuit is closed around the generator G at D2, including resistor RS and the resistors RB1 and RB2; and the field resistor 45 is cut in at GF3.

The field resistor 47 is cut in at ACR1.

The resistor RS is cut out at A1.

The resistor RB2 is cut out at DB2.

The contactors SU3 and SU4 close.

The effects of these changes to quickly stop the motor M are as follows:

To stop the motor M, it is contemplated that the field of the generator will be weakened and ultimately destroyed so that the generator will cease developing voltage and supplying current to the motor; and that the motor M itself will be dynamically braked; and that the motor M will supply current to the generator G which in turn will further brake the motor M. But to do this in the quickest possible time, a number of interactions and quantities and sequences have been found necessary which are not obviously apparent from the foregoing.

The generator field 8 must be weakened at the maximum rate possible without developing a destructive field discharge voltage, and this is done by several concurrent actions. The field is energized by a closed loop circuit connected across the lines 5 and 6, the field 8 being energized in parallel with its resistor 44 in this loop, so that when the loop is cut off from the supply lines at LV1, this loop becomes a discharge circuit without other change or provision, and the field starts to decay, or discharge, safely. The discharge circuit at this time contains resistors 44 and 46. A low resistance local load circuit is closed around the generator G which includes the resistors, RS, RB1, and RB2. The generator supplies local load current to this local circuit and the resistor RS is given such ohmic value that, at the start, this local current is the maximum current which the generator armature can safely carry and commutate, and in consequence, this current in the generator armature produces a field demagnetizing armature-reaction of the maximum possible degree which reduces the effective field flux and reduces the voltage.

The generator voltage producing field flux is thus concurrently weakened both by armature demagnetization reaction, and by the dying out or discharging of the field through the field resistors 46 and 44.

The voltage of the generator thus dies out at a much more rapid rate than if the field energization alone were weakened, or if it merely died out at the maximum safe discharge rate alone.

Furthermore, the field flux is caused to progressively die out faster and the generator voltage to be reduced faster, by the successive cutting in of field resistors 45 and 47.

While this very rapid weakening of the generator field and voltage is going on, the motor M is acting as a generator and is being dynamically braked and rapidly slowed down by a braking circuit including the same resistors RB1 and RB2, and this braking action is magnified by artificially increasing or forcing the motor field to an excessive degree of energization, the value of the braking current thus controlled by the resistors being made at the start, the maximum value of current which the motor armature can carry and commutate.

At the start the dynamic braking of the motor M and the weakening of the generator field go on independently of each other (except for the common utilization of resistors RB1 and RB2); but after a brief period of time the voltage of the generator becomes less than the counter voltage of the motor M acting as a generator, and this time period is reduced to the minimum by effecting rapid reduction of the generator voltage as described.

The motor M then begins to supply current to the generator G which brakes the motor in addition to its own dynamic braking current. The generator G being connected to the source motor 1, which preferably is a squirrel cage induction motor, tends to act as a motor itself and drive the induction motor above synchronism as a generator; but because of the steep torque curve of the induction motor, its speed will be increased very little, so that the generator G as a motor will increase very little in speed, and its counter voltage will present substantially no increased opposition to the voltage from the motor M, so that the motor M will now be braked both by its own dynamic braking current and by the current supplied to the generator.

The field and voltage of the generator G continue to die out, but the current supplied to the generator G by the motor M to brake the motor is maintained at a high braking value notwithstanding that the motor voltage itself dies out also due to its slowing down, because the decrease of one voltage is compensated by the decrease of the other.

As the motor M slows down and its voltage as a generator decreases, and as the voltage of the generator G also decreases, each is able to carry and commutate more current; the contacts A1 threfore can now close and by shorting the resistor RS boost the braking current from the motor M to the generator G safely. The continued further reduction of the voltage of generator G to a value farther and farther below that of the motor M still farther boosts or increases this braking current. The shorting of the braking resistor RB2, still further brakes the motor M by boosting the current in the dynamic braking circuit.

The field of the generator is finally completely destroyed by closing of the contacts SU3 and SU4, and the generator armature then is driven by the source motor 1 without developing any voltage, and is in a short circuit across the motor M; and this in addition to the low resistance local dynamic circuit across the motor M accompanied by very low voltage of the motor due to its reduced speed provides a total braking current of 200% to 400% of the current which it can carry at normal voltage. The motor torque therefore rises to a very great value and brings the motor to rest.

It will be noted from the above that the closure of contacts A1 to give a boost to the braking current from the motor M to the generator G, and the closure of the contacts DB2 to boost the local dynamic braking current of the motor M, are timed by adjustably delaying the restoring of contactor ACR. When it restores and closes contacts ACR3, contactor A operates and closes contacts A1, shorting resistor RS. Contactor A then also opens contacts A2 which de-energize contactor DB and the latter closes contacts DB2 and shorts the dynamic braking resistor RB2.

It is desirable to time the contactor ACR so that the contacts A1 will short the resistor RS (to be followed by shorting of resistor DB2) at just about the instant when the voltage of motor M balances or equals the falling voltage of the generator G, so that the resistor RS will not restrict current from the motor to the generator; and the contactor ACR is timed and set to bring this about. However it is also desirable to have contacts SU3 and SU4 close to finally destroy the generator field as soon as this can be done without causing a dangerous peak in the main current; but (in the absence of other provisions) the contactor SU will be de-energized and close the contacts SU3 and SU4 upon opening of contacts DB1 and the contacts SU3 and SU4 will thus be timed by the contactor ACR, which times the contactor DB.

Depending upon the speed of the motor when the emergency stop is initiated, the voltage of the generator may have fallen to the value at which the contacts SU3 and SU4 can safely be closed, before the set timing of contactor ACR effects opening of contacts DB1. In such event the contactor VR will restore and open its contacts VR1 and cause contacts SU3 and SU4 to close independently of the opening of contacts DB1 by the said timing.

It will be observed that when the contacts D2 close, they simultaneously establish a load circuit across the generator G and a dynamic braking circuit across the motor M. In the present embodiment this as shown can be a common bridging circuit, comprising common resistors RB1 and RB2. The electrical loading of the generator G for field demagnetizing purposes, and the electrical loading of the motor M for braking purposes are therefore both produced by a single set of circuit elements; so that by the time that the resistor RB2 is cut out of this circuit, and boosts the dynamic braking current of the motor M, the motor is already being braked by current to the generator G and this braking current is added to the boosted dynamic braking current.

The simplification and economy afforded by this provision, and the producing of the said effects simultaneously to keep them coordinated and without lapses of time between them are among the advantages of this invention.

According to the foregoing when emergency stop is initiated the field magnetism and voltage of the generator G is rapidly weakened by cutting off the energizing potential from the loop circuit of the field 8; and allowing it to discharge at a controlled safe rate in that loop circuit; and by electrically loading the generator G by a local circuit to produce armature-reaction-demagnetization; and by connecting the field 8 to the generator G with reverse demagnetizing polarity.

As a further means, to effect still more rapid reduction of the generator field magnetism and voltage, a generator with a series field winding may be utilized. In such cases I prefer to put the series field winding in the circuit as indicated at 93 in Fig. 5. Otherwise the system of Fig. 5 may be the same as that of Fig. 1.

In the operation of this modification, the normally closed contacts A1 keep the series field winding 93 shorted along with resistor RS, during normal operation of the generator G and load driving motor M, so that it does not function like the usual generator series field winding. During emergency stopping, and as described for Fig. 1, contacts D2 close a local circuit for the generator for armature-reaction demagnetizing purposes and the contacts A1 open to include the resistor RS in the local circuit to predetermine the maximum demagnetizing local current, and at the same time they include the field winding 93 in this circuit. The terminals of the field winding 93 are connected in this circuit as to polarity so that the magnetomotive force produced in it by this local current is opposite to that of the field winding 8, whereby it exerts a demagnetizing action on the generator field.

The contacts A1 close at, or about, the time that current from the motor M starts to flow in the other direction to the generator G as described, so that the winding 93 is shorted and does not build up flux in the generator field in the other direction which would tend to retard the falling of the generator voltage.

In some instances it is of course desirable to stop the motor M without emergency-stop, when the motor is running at regular production speed; and this is done by depressing the stop-reset switch to open its contacts 26. This cuts off the holding current from contactor RN, and it restores; and its contacts RN2 open and prevent it from operating again when the stop-reset switch is released; and its contacts RN4 open and restore all of the field resistor controlling contactors GFA to GFD, reinserting all of the field resistors 48 to 51; and its contacts RN3 open and restore contactor GF whose contacts GF1 and GF2 open and cut off the loop circuit of the generator field 8 from the lines 5—6, and whose contacts GF3 insert resistor 45 into the generator field discharge loop circuit.

The field and voltage of the generator thus decay by discharge, in a loop circuit whose resistance controls the rate of discharge to a safe value.

Contactor SU is, for a time, held operated by contacts VR1 and DB1 (contacts RN1 having opened), but when the generator voltage has fallen sufficiently, contactor VR will restore and open its contacts VR1, thereby restoring contactor SU, and its contacts SU3 and SU4 thereupon close and completely destroy the generator field. The motor M is braked to stop it, by supplying current (as a generator) to the generator G when the generator field and voltage have become sufficiently weakened. The contacts A1 are closed and the armature of the generator is in a low resistance path across the motor armature, by way of circuit 56, A1, 55, 59, 58, and 57. Stopping the motor M in this manner when running at production speed will be seen to be similar to stopping it during inching.

The emergency switches 29 and 30 have each been shown in Fig. 1 as breaking the circuit to the winding of contactor LV at a point between the winding and only one of the supply mains, 5 or 6. In some cases, as a safety precaution, it may be desirable to arrange the construction of these emergency switches and their connections so that any one of them will break the supply current at both sides of the winding. Such possible arrangements are believed to be known to those skilled in the art and it is thought to be unnecessary to illustrate or describe them.

In Fig. 1, for inching movements of the motor M, the motor is started by the start switch 38 and is stopped by the stop-reset switch 25. In some cases it may be desirable to effect starting and stopping inching movements on a single push button switch, and the modification of Fig. 6 shows how this may be done.

The start switch, here 38A, besides its contacts 40, has contacts 40A normally bridged by a switch 94. This modification is otherwise the same as Fig. 1, and when the start switch contacts 40 are closed, the contactors RN, SU, and GF operate as before, and the series of accelerating contactors GFA to GFD (of which only GFA is shown) operate to start and speed up the motor M, and it can be stopped only at the stop-reset switch 25.

For inching with this arrangement, the switch 94 is first opened and left open. Then upon operating the start switch 38A, the contacts 40A take the place of the switch 94, and so long as both of its contacts 40 and 40A are held closed the contactors RN, SU, GF operate and again start and speed up the motor; but the holding circuit for the contactors RN, SU, and GF is by way of the wire 39 as hereinbefore described, and the contacts 40A are in the line of this wire, so that when the start switch is released and opens its contacts 40A, the holding circuit is opened and the contactors RN, SU, and GF, etc., all restore and the motor M stops.

It was explained above that it is desirable, upon emergency stopping of the motor M, to have the contacts A1 close to short out the resistor RS (and also the series field 93 of the generator G when utilized as in Fig. 5) at just about the instant when the voltage from the motor M balances the rapidly falling voltage of the generator G; and one means was described for doing this by adjustment of the delayed return of contactor ACR to close its contacts ACR3.

Another or modified way to do this; and which will be independent of the production speed of the motor M when emergency stopping is initiated, is shown in Fig. 7; parts not shown in this figure being the same as in Fig. 1.

The contactor DBR has an additional pair of normally open contacts DBR3; and these are in a line from the wire 15, to a wire 95, to the winding $a$ of an additional contactor CR and thence to the wire 32 and line 6. The contactor CR has also a winding $b$ connected across the resistor RS.

The contacts ACR3 are omitted from the contactor ACR.

Upon starting up the motor M, upon closure of contacts D1, contactor DBR operates. Its contacts DBR3 effect operation of contactor CR by winding a and its contacts CR1 open, leaving the contactor A energized through contacts LV6 and LV5, and holding its contacts A1 closed.

During emergency stop, when contactor LV restores, and contacts LV6 open, contactor A restores and opens contacts A1 inserting resistor RS, and the generator G is loaded by current through wire 55, resistor RS, wire 56, etc., as described. This causes a drop of potential across the resistor RS which energizes winding b of contactor CR as a holding winding.

When contacts D1 open de-energizing contactor DBR, and contacts DBR1 and DBR3 open and de-energize contactor ACR and winding a of contactor CR, contactor ACR restores opening its contacts ACR1 and ACR2 with the results described for Fig. 1, but contactor CR is held operated by winding b and still holds contacts CR1 open, keeping contactor A de-energized.

When the voltage of motor M balances the falling voltage of generator G, current stops flowing in the resistor RS and the holding winding b accordingly becomes de-energized and contactor CR restores, closing its contacts CR1 and this energizes contactor A which closes contacts A1 and shorts the resistor RS for the purposes referred to.

The contacts CR1 thus take the place of contacts ACR3 of Fig. 1, but close in response to balanced voltages of the motor and generator, instead of being given a set timed closure as were the contacts ACR3 of Fig. 1.

The invention is not limited to the exact details of construction, illustrated, and described. Changes and modifications may be made, and the invention comprehends all such changes and modifications which come within the scope of the appended claims.

I claim:

1. In a motor control system, a direct-current load-driving-motor supplied by current from a direct-current generator having a current energized field and connected in series with the motor, and means to effect quick stopping of the motor comprising means for quickly reducing the generator voltage by weakening its field energization, and electrically loading the generator independently of its motor load to cause further weakening of the generator field by armature demagnetizing reaction, and concurrently dynamically braking the motor.

2. In a motor control system, a direct-current load-driving-motor supplied by current from a direct-current generator having a current energized field and connected in series with the motor, and means to effect quick stopping of the motor comprising means for quickly reducing the generator voltage by weakening its field energization, and electrically loading the generator independently of its motor load to cause further weakening of the generator field by armature demagnetizing reaction, and concurrently dynamically braking the motor; and comprising means to subsequently cause further braking of the motor by the current load thereof supplied to the generator effective after the voltage of the generator has fallen below that of the motor.

3. In a motor control system, a direct-current load-driving-motor supplied by current from a direct-current generator having a current energized field and connected in series with the motor, and means to effect quick stopping of the motor comprising means for quickly reducing the generator voltage by weakening its field energization, and electrically loading the generator independently of its motor load to cause further weakening of the generator field by armature demagnetizing reaction, and concurrently dynamically braking the motor; and comprising means to subsequently cause further braking of the motor by the current load thereof supplied to the generator effective after the voltage of the generator has fallen below that of the motor; concurrently with continued dynamic braking of the motor.

4. In a motor control system, a direct-current load-driving-motor having an energized shunt field, and connected in a series circuit with a direct-current generator having an energized shunt field, and means to effect quick stopping of the motor comprising circuit means bridging both the generator and the motor to electrically load the generator and cause weakening of its field and voltage by armature-reaction-demagnetization, and to also electrically load the motor as a generator to dynamically brake it; and means to concurrently additionally weaken the generator field and voltage comprising means discontinuing the energization of the generator field, and establishing a discharge circuit for it, and controlling the rate of its discharge.

5. In a motor control system, a direct-current load-driving-motor having an energized shunt field, and connected in a series circuit with a direct current generator having an energized shunt field, and means to effect quick stopping of the motor comprising circuit means bridging both the generator and the motor to electrically load the generator and cause weakening of its field and voltage by armature-reaction-demagnetization, and to also electrically load the motor as a generator to dynamically brake it; and means to concurrently additionally weaken the generator field and voltage comprising means discontinuing the energization of the generator field, and establishing a discharge circuit for it, and controlling the rate of its discharge; and means controlling the electrical load of the generator, and controlling the braking electrical load of the motor.

6. In a motor control system, a direct-current load-driving-motor having an energized shunt field, and connected in a series circuit with a direct current generator having an energized shunt field, and means to effect quick stopping of the motor comprising circuit means bridging both the generator and the motor to electrically load the generator and cause weakening of its field and voltage by armature-reaction-demagnetization, and to also electrically load the motor as a generator to dynamically brake it; and means to concurrently additionally weaken the generator field and voltage comprising means discontinuing the energization of the generator field, and establishing a discharge circuit for it, and controlling the rate of its discharge; and means controlling the resistance of the said circuit means and thereby controlling the electrical load of the generator and the braking electrical load of the motor.

7. In a motor control system, a direct-current load-driving-motor having an energized shunt field, and connected in a series circuit with a direct-current generator having an energized shunt field, and means to effect quick stopping of the motor comprising means forcing the energization of the motor field; circuit means bridging both the generator and the motor to electrically load the generator and cause weakening of its field and voltage by armature-reaction-demagnetization, and to also electrically load the motor as a generator to dynamically brake it; and means to concurrently additionally weaken the generator field and voltage comprising means discontinuing the energization of the generator field, and establishing a discharge circuit for it, and controlling the rate of its discharge; means causing the motor to supply current to the generator over said series circuit to further brake the motor effective upon reduction of the generator voltage by said field-weakening; and means effecting energizing of the generator field by reversed polarity of the generator to finally destroy the generator field.

8. In a motor control system, a source of direct current at constant potential; a generator driven at substantially constant speed and having a shunt field winding energized from the source; a power-supplying motor supplied with current from the generator and having a shunt field winding energized from the source; means to control energization of the generator field to start and stop the motor with inching movements; means to vary the generator field energization to vary the motor operating speed within a first range of speeds; means to vary the motor field energization to vary its operating speed within a second range of speeds; and emergency stop means for the motor comprising: means to force energization of the motor field, contactor means to disconnect the generator field winding from the source, a discharge circuit for the generator field winding, contactor means to vary the resistance of the discharge circuit, a local circuit for bridging the generator and the motor and contactor means to close it, and the local circuit having resistance of preselected value to cause current from the generator in the local circuit to further weaken the generator field and voltage by armature-reaction-demagnetization, the local circuit also effecting dynamic braking of the motor, and means to vary the resistance of the local circuit.

9. In a motor control system, a source of direct current at constant potential; a generator driven at substantially constant speed and having a shunt field winding energized from the source; a power-supplying motor supplied with current from the generator and having a shunt field winding energized from the source; and emergency stop means for the motor comprising: means to force energization of the motor field, contactor means to disconnect the generator field winding from the source; a discharge circuit for the generator field winding, contactor means to vary the resistance of the discharge circuit, a local circuit for bridging the generator and the motor and contactor means to close it, and the local circuit having resistance of pre-selected value to cause current from the generator in the local circuit to further weaken the generator field and voltage by armature-reaction-demagnetization, the local circuit also effecting dynamic braking of the motor, and means to vary the resistance of the local circuit.

10. In a motor control system, a source of direct current at constant potential; a generator driven at substantially constant speed and having a shunt field winding energized from the source; a power-supplying motor supplied with current from the generator and having a shunt field winding energized from the source; and emergency stop means for the motor comprising: contactor means to disconnect the generator field winding from the source, a discharge circuit for the generator field winding, contactor means to vary the resistance of the discharge circuit, circuit connections and contactor means for closing a loading circuit across the generator to electrically load it, the loading circuit comprising resistance of preselected value to cause the electrical load to further weaken the generator field by armature-reaction-demagnetization, means to vary the resistance of the loading circuit, and a variable-resistance dynamic-braking circuit for the motor, at least a part of the resistance of the loading circuit being common to the dynamic braking circuit.

11. In a motor control system, a direct-current load-driving-motor connected in a circuit in series with a direct-current generator, and means to effect quick stopping of the motor comprising means weakening the generator field and voltage by weakening the field energization, and electrically loading the generator independently of its series connection with the motor to cause concurrent further weakening of the generator field and voltage by demagnetizing armature reaction; means dynamically braking the motor, independently of its series connection with the generator; and, means concurrently additionally braking the motor by braking current from the motor in the series circuit through the generator, effective upon weakening of the generator field.

12. In a motor control circuit and apparatus system, a pair of direct current supply mains; a generator driven by a source of power and having a shunt field winding always connected in a loop in parallel with first field resistance and the loop being connected in series with second field resistance; a motor in series with the generator and supplied with current from the generator and having a shunt field winding energized from the source; means to start and stop the motor comprising means to connect one supply main to the loop and the other supply main to the second field resistance and to control the total field resistance, and to disconnect the said mains; emergency means to quickly stop the motor comprising: means to effect disconnecting of the generator field loop from the supply mains and to allow it to discharge in the loop to weaken its field and voltage; and comprising means to effect closing of local circuit means across the generator and the motor, having predetermined resistance to cause the motor to be dynamically braked at the maximum safe rate and to also cause the generator to be electrically loaded to the maximum safe degree, independently of its series connection with the motor to weaken its field and voltage by armature-reaction-demagnetization; and comprising means to control the resistance of the local circuit means to cause the motor to supply unrestricted current to the generator to further brake the motor after weakening of the generator voltage to balance that of the motor, and independently of continued dynamic braking of the motor; and comprising means to destroy the generator field and voltage by reverse energization of its field winding.

OSWALD M. BUNDY.

REFERENCES CITED

The following references are of record in the file of this patent:

UNITED STATES PATENTS

| Number | Name | Date |
|---|---|---|
| 696,017 | Dutton | Mar. 25, 1902 |
| 2,249,857 | Schaelchlin | July 22, 1941 |